(No Model.)  3 Sheets—Sheet 1.
E. A. MUNGER.
SPRING HEEL.
No. 380,507.  Patented Apr. 3, 1888.
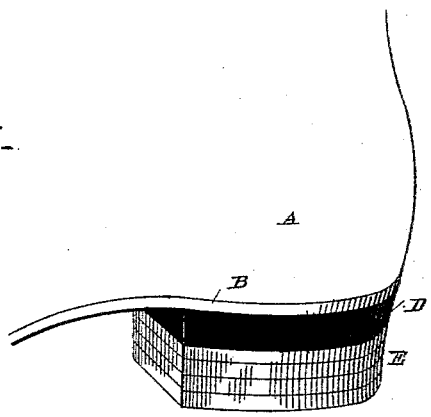
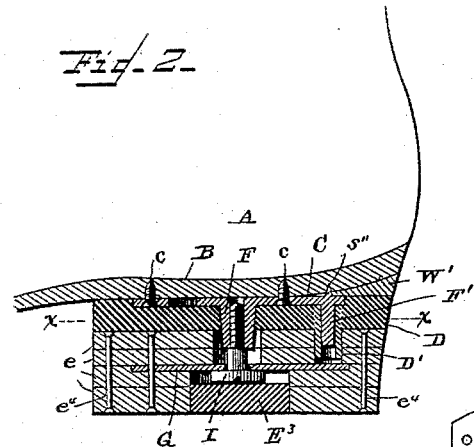
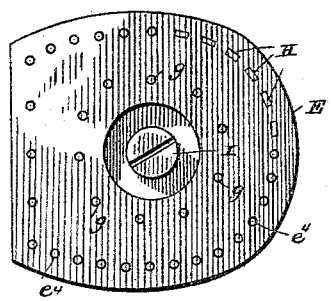
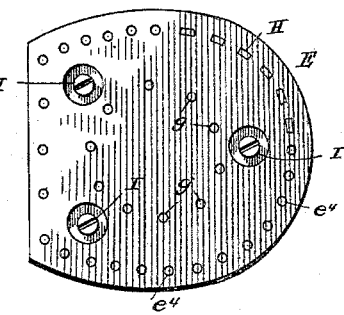
WITNESSES.  
Edwin L. Yewell.  
Wm. J. Littell.
INVENTOR.  
Ernest A. Munger.  
by J. R. Littell, Attorney.

(No Model.) 3 Sheets—Sheet 2.
E. A. MUNGER.
SPRING HEEL.
No. 380,507. Patented Apr. 3, 1888.
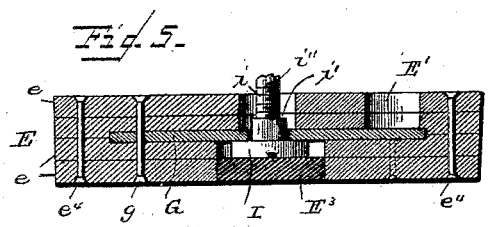
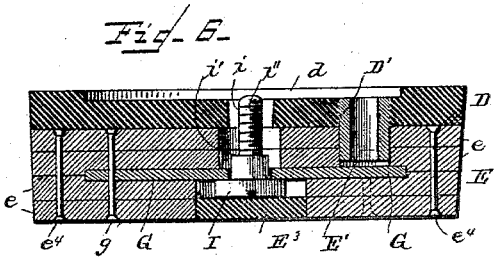
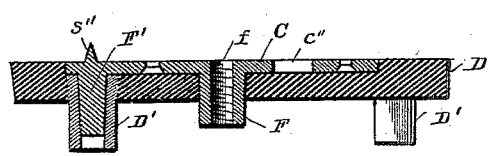
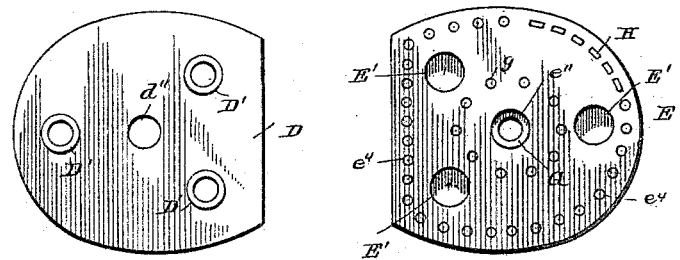
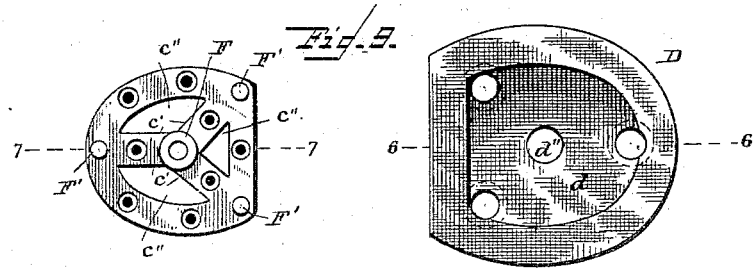
WITNESSES. INVENTOR.

(No Model.) 3 Sheets—Sheet 3.
E. A. MUNGER.
SPRING HEEL.

No. 380,507. Patented Apr. 3, 1888.

WITNESSES.
Edwin L. Yewell.
Wm. J. Littell,

INVENTOR.
Ernest A. Munger,
by J. R. Littell,
Attorney

UNITED STATES PATENT OFFICE.

ERNEST A. MUNGER, OF BEAVER DAM, WISCONSIN, ASSIGNOR TO GEORGE E. SWAN, OF SAME PLACE.

SPRING-HEEL.

SPECIFICATION forming part of Letters Patent No. 380,507, dated April 3, 1888.

Application filed October 4, 1887. Serial No. 251,449. (No model.)

*To all whom it may concern:*

Be it known that I, ERNEST A. MUNGER, a citizen of the United States, residing at Beaver Dam, in the county of Dodge and State of Wisconsin, have invented certain new and useful Improvements in Flexible or Spring Heels; and I do hereby declare that the following is a full, clear, and exact description of the invention, which will enable others skilled in the art to which it appertains to make and use the same.

This invention relates to elastic or spring heels of that class in which a device comprising a plate, a cushion, and a lift is adapted to be applied to the heels of boots or shoes; and the object of my invention is to provide an improved device of the class described, which will obviate the jar usually experienced in walking upon hard or unyielding pavements, which will give a forward spring movement in walking, and which will possess advantages in point of simplicity, durability, and inexpensiveness, ease of application, and general efficiency.

Figure 10:
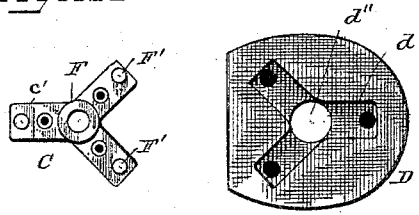
Figure 11:
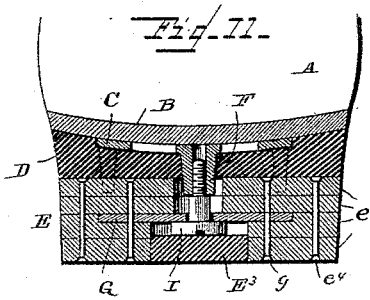
Figure 12:
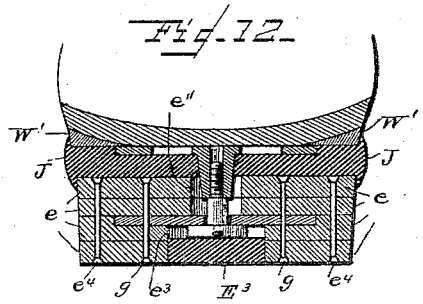
Figure 13:
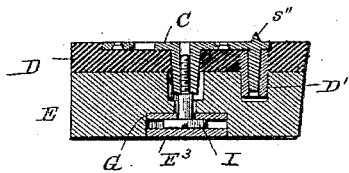
Figure 14:
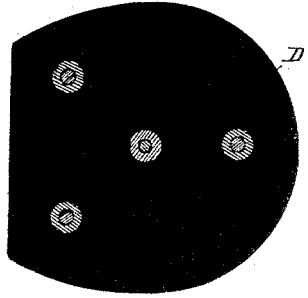

In the drawings, Figure 1 is a perspective view illustrating a heel embodying my improvements. Fig. 2 is a central longitudinal section thereof. Fig. 3 is a bottom plan view of the retaining-lift. Fig. 4 is a similar view illustrating a modification in which three retaining-screws are employed. Figs. 5, 6, and 7 are enlarged central longitudinal sections of the connections between the layers of retaining-lift, lift and cushion, and cushion and plate, respectively, the two latter being on lines 6 6 and 7 7 of Fig. 9. Fig. 8 is a diagram showing lower face of cushion and corresponding upper face of retaining-lift. Fig. 9 is a diagram showing lower face of plate and corresponding upper face of cushion. Fig. 10 is a diagram similar to Fig. 9, showing a modification thereof for use on small-sized heels. Fig. 11 is a transverse section showing a curved plate and the cushion attached thereto. Fig. 12 is a transverse section showing a cushion having projecting lips covering the seams or cracks between it and the plate and retaining-lift. Fig. 13 is a longitudinal section showing a modified form of retaining-lift and attachment for use on small heels. Fig. 14 is a horizontal section on the line $x\ x$, Fig. 2.

Corresponding parts in the figures are denoted by the same letters of reference.

Referring to the drawings, A designates the heel or "counter" of a boot or shoe, and B the lower sole-piece thereof extending completely below the same. To the sole B is secured a metallic plate, C, by means of screws $c$, whose heads are countersunk therein, and whose shanks pass through the plate and into the sole B. The plate C is made in skeleton shape for ordinary heels, having radial webs $c'$, connecting its front corners and central rear portion with a downwardly-projecting cone-shaped stud, F, formed integrally with said plate, and centrally bored and screw-threaded, as at $f$, Fig. 7. Around the outer edge of the heel extends a rim with which the webs $c'$ connect at their outer ends, leaving open spaces $c''$ in the plate, as shown.

The plate C is also provided with downwardly-projecting studs F', (preferably three in number,) passing through elastic tubular extensions or projections D', projecting downwardly from the cushion D and entering corresponding recesses, E', in the top of the retaining-lift portion E. These studs are not long enough to strike the metallic washer G in the lift E in operation, but permit room for compression and allow full play of the cushion in walking. For smaller-sized heels, as on ladies' shoes, the plate C may be made in the form illustrated in Fig. 10, wherein the peripheral rim is dispensed with. The plate C may be flat, or may conform with the curved lower face of the sole B, as in Fig. 11; but preferably a welt, W', is interposed between the sole B and plate C to level up the heel portion of the shoe.

Next below the plate C is applied the cushion D, which may be constructed of rubber or of any other suitable and durable yielding material sufficiently hardened to meet the demand. The cushion D preferably has a recess, $d$, in its upper face to accommodate the plate C. In addition, the upper face of the cushion may be curved in general outline to conform with the curvature of the plate, as in Fig. 11, when a curved plate is employed. The lower face of said cushion is, however, flat, except where provided with the downward tubular projections D'. The cushion is, moreover, centrally pierced at $d''$ with a hole fitting closely around the stud F, which projects through and slightly beyond said cushion.

Next below the cushion D is applied the retaining-lift E, which is composed of two or more layers, $e$, the upper face of the upper layer being provided with holes or sockets E' for receiving the downward projections D' on the cushion. Centrally of the thickness of said lift and between the layers thereof is inserted a metallic washer, G, smaller in diameter than said lift. The lift is centrally pierced above said washer with a hole, $e''$, larger than the stud F, and below said washer with a hole, $e^3$, larger than the hole $e''$, both said holes being larger than that in the washer G. A series of nails, screws, or rivets, $g$, is passed through the lift and washer, and another series, $e^4$, through the several layers of the lift outside of and around said washer, and hob-nails H may be inserted in the lower face of the lower layer of the lift. The lift E is preferably constructed of leather, though any suitable equivalent may be used, and the opening $e^3$ is in practice preferably closed by a rubber plug, $E^3$.

If desired, I may construct the plate C with three or even more studs, F, the cushion and lift in that case being provided with corresponding holes for the same, as seen in Fig. 4. In this case the studs F take the place of the studs F' and extend through the tubular projections D', and are likewise provided with central screw-threaded perforations, and the central stud F is entirely dispensed with. The plate being secured to the sole B, and the cushion and lift being placed thereon in proper position, the several parts are retained in assembled position by means of a screw, I, having a head smaller than the hole $e^3$ in the lift, but larger than the hole in the washer. The shank $i$ of the screw is smaller than said hole in the washer, and at a point above the upper face of the washer said shank is reduced, forming a shoulder, $i'$, as in Fig. 5. Above the shoulder $i'$ the shank is screw-threaded, as at $i''$. The screw is passed through the holes in the lift, washer, and cushion, and its shank screwed into the hole $f$ in the stud until the shoulder $i'$ abuts against the lower end of said stud, when the head of the screw will be in position to clamp the several parts firmly in place. On small heels the lift can be formed of a solid piece pressed out of rawhide or paper or other suitable composition, and the washer G may be clamped to and indented within the lower face of the lift, as seen in Fig. 13; but I prefer to construct the heel as elsewhere shown. The parts being thus assembled and secured in place, the cushion is prevented from turning on the plate and the lift on the cushion by the intermeshing projections and apertures, and by the use of the studs F. The screw I being loose in the holes in the lift and washer, the lower part of the heel is permitted to rock in walking, compressing the cushion, as will be obvious, and thus greatly facilitating the motion of the foot. The nails or rivets $e'$ and $g$ and the hob-nails H prevent wear on the lower layer of the lift, and the head of the screw I being countersunk will not bear upon the ground and become worn.

If desired, the cushion D may be provided around its edges with upwardly and downwardly projecting lips or flanges J, covering the seams or cracks between said cushion and the plate C and lift E.

From the foregoing construction it will be understood that when the heel is compressed or stepped upon the retaining-screw is relieved and the studs surrounded by the tubular rubber projections or cushions D' take all the strain and shock, and the heel is thus cushioned in all directions.

The plate is preferably provided with three or more spurs or projections, $s''$, upon its upper surface, which enter the sole of the shoe and relieve the screws $c$ or other securing device from strain or breakage.

A heel as thus constructed possesses many advantages over those now on the market, and by reason of its springing or yielding nature will wear much longer. At the same time it will assist the wearer in walking by its forward spring, and prevent irritation of the heel of the foot, frequently caused by walking on hard pavements.

I do not confine myself to the precise details of construction hereinbefore set forth, as modifications and alterations therein may be made consistent with the scope of the claims.

Having thus described my invention, I claim—

1. The herein-described spring-heel, the same comprising a metallic plate secured to the sole of the boot or shoe, a cushion fitting said metallic plate closely, a lift fitting said cushion closely, and a screw for removably clamping said lift in position and the cushion between said lift and plate.

2. The herein-described spring-heel, the same comprising a plate secured to the sole of the boot or shoe and provided with downwardly-projecting studs, a cushion provided with tubular projections on its lower face receiving said studs, a lift provided with recesses in its upper face engaging said tubular projections on the cushion, the adjacent faces of all said parts fitting each other closely, and a screw for removably clamping said lift in position and the cushion between said lift and plate.

3. The herein-described spring-heel, the same comprising a curved metallic plate secured to the sole of the boot or shoe, a cushion fitting said plate closely, its upper face being curved and its lower face flat, a lift fitting said cushion closely, and a screw for removably clamping said lift in position and the cushion between said lift and plate.

4. The herein-described spring-heel, the same comprising a metallic plate secured to the sole of the boot or shoe, downwardly-projecting studs formed thereon, one or more of which are provided with a vertical screw-threaded hole, a cushion provided with apertures or recesses receiving said studs, a lift also provided with an aperture into which said screw-threaded stud extends, and a screw, its shank passing into said screw-threaded hole in the stud, said screw removably clamping said lift in position and securing said cushion upon said stud and between said lift and plate.

5. The herein-described spring-heel, the same comprising a metallic plate secured to the sole of the boot or shoe, a downwardly-projecting stud formed thereon and provided with a vertical screw-threaded hole, a cushion provided with an aperture fitting said stud, a lift also provided with an aperture into which said stud extends, and a screw comprising a reduced screw-threaded shank passing into said hole in the stud, an enlarged shank forming a shoulder abutting against the lower end of said stud, and a head removably clamping said lift in position and said cushion between said lift and plate.

6. The herein-described spring-heel, the same comprising a metallic plate secured to the sole of the boot or shoe, a downwardly-projecting stud formed centrally thereon and provided with a vertical screw-threaded hole, a cushion provided with an aperture fitting said stud, a lift also provided with an aperture in which said stud loosely fits, said plate, cushion, and lift being provided with registering studs, tubular projections, and recesses or depressions on their meeting faces for the purpose described, and a screw, its shank passing loosely through said hole in said lift and into said hole in the stud, and its head removably clamping said lift in position and said cushion between said lift and plate.

7. The combination, with a metallic plate secured to the sole of a boot or shoe and a stud projecting downwardly therefrom and provided with a screw-threaded hole, of a lift composed of two or more layers, a washer secured within said lift, said lift being provided with a hole above said washer for receiving the lower end of the stud, and a larger hole below said washer, and a screw, its shank passing loosely through said washer and into the hole in the stud, and its head fitting loosely in said hole below the washer and against said washer for removably clamping said lift in position.

8. The combination, with a metallic plate secured to the sole of a boot or shoe and a stud projecting downwardly therefrom and provided with a screw-threaded hole, of a lift composed of two or more layers, a washer secured within said lift, said lift being provided with a hole above said washer for receiving the lower end of the stud, and a larger hole below said washer, and a screw comprising a reduced screw-threaded shank fitting said hole in the stud, an enlarged shank fitting loosely in the hole in the washer and forming a shoulder abutting against the lower end of the stud, and a head fitting loosely in said hole below the washer and against said washer for removably clamping said lift in position.

9. In a spring-heel, the combination of a metallic plate secured to the sole of a boot or shoe, a cushion fitting against said plate, a lift fitting said cushion, lips on the outer edges of said cushion covering the cracks between said cushion and the plate and lift, and a screw for securing said lift in position and clamping said cushion between said lift and plate.

10. The metallic plate comprising a peripheral rim, a central stud and radial arms connecting said rim and stud, said plate being secured to the sole of a boot or shoe, in combination with the cushion having a recess engaging said plate, and a hole engaging said stud, and a screw for securing said cushion in position.

11. The metallic plate provided with a stud having a screw-threaded hole, said plate being secured to the sole of a boot or shoe, in combination with the lift comprising the layers provided with holes $e''$ $e''$, the washer G, secured between said layers, nails $g$, passing through said layers and washer, nails $e^4$, passing through said layers around said washer, and the screw having a shank passing into the hole in the stud, and a head abutting against said washer for removably clamping said lift in position.

In testimony whereof I affix my signature in presence of two witnesses.

ERNEST A. MUNGER.

Witnesses:
J. E. HOSMER,
J. P. McGILL.